(12) United States Patent
Sinharoy

(10) Patent No.: US 6,910,124 B1
(45) Date of Patent: Jun. 21, 2005

(54) APPARATUS AND METHOD FOR RECOVERING A LINK STACK FROM MIS-SPECULATION

(75) Inventor: Balaram Sinharoy, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/562,161

(22) Filed: May 2, 2000

(51) Int. Cl.⁷ .............................................. G06F 9/00
(52) U.S. Cl. ...................... 712/228; 712/242
(58) Field of Search ................................ 712/242, 228

(56) References Cited

U.S. PATENT DOCUMENTS

| | | | | |
|---|---|---|---|---|
| 5,142,634 A | | 8/1992 | Fite et al. ................ | 395/375 |
| 5,522,072 A | * | 5/1996 | De Bruler ................ | 712/220 |
| 5,574,871 A | | 11/1996 | Hoyt et al. .............. | 395/376 |
| 5,604,877 A | * | 2/1997 | Hoyt et al. .............. | 712/243 |
| 6,157,999 A | * | 12/2000 | Rossbach et al. ........ | 712/243 |
| 6,253,315 B1 | * | 6/2001 | Yeh ........................ | 712/238 |
| 6,289,446 B1 | * | 9/2001 | Nilsson .................. | 712/244 |

OTHER PUBLICATIONS

Hennessy and Patterson, Computer Organization and Design The Hardware/Software Interface, Second Edition, 1998, Morgan Kaufmann, pp. A22–A28 and 136–139.*
Stephan Jourdan et al., "Recovery Requirements of Branch Prediction Storage Structures in the Presence of Mispredicted-Path Execution," *International Journal of Parallel Programming*, vol. 25, No. 5 1997, p. 363–383.

* cited by examiner

*Primary Examiner*—Eddie Chan
*Assistant Examiner*—Charles Harkness
(74) *Attorney, Agent, or Firm*—Winstead Sechrest & Minick P.C.; Mark E. McBurney

(57) ABSTRACT

A method of performing link stack operations comprises the steps of reading and writing to a link stack. During a write, a location in the link stack pointed to by a current write pointer is selected and a link address associated with an instruction and a current read pointer to the link stack are written into the selected location. After the write operation, the read pointer is updated such that the new read pointer equals the current write pointer and the write pointer is updated. During a read from the link stack, a location in the link stack is selected using a current read pointer. A new read pointer and a link address associated with an instruction are read from the selected read location.

23 Claims, 10 Drawing Sheets

58

| Address of the Branch | Predicted Address | Write_ptr | Read_ptr | Current_stack_op | Branch Prediction |
|---|---|---|---|---|---|
| 58a | 58b | 58c | 58d | 58e | 58f |

| Address of the Branch 58a | Predicted Address 58b | Write_ptr 58c | Read_ptr 58d | Current_stack_op 58e | Branch Prediction 58f |
|---|---|---|---|---|---|

| Return Address 66a | Read_pointer 66b |
|---|---|

(con't)

(con't)

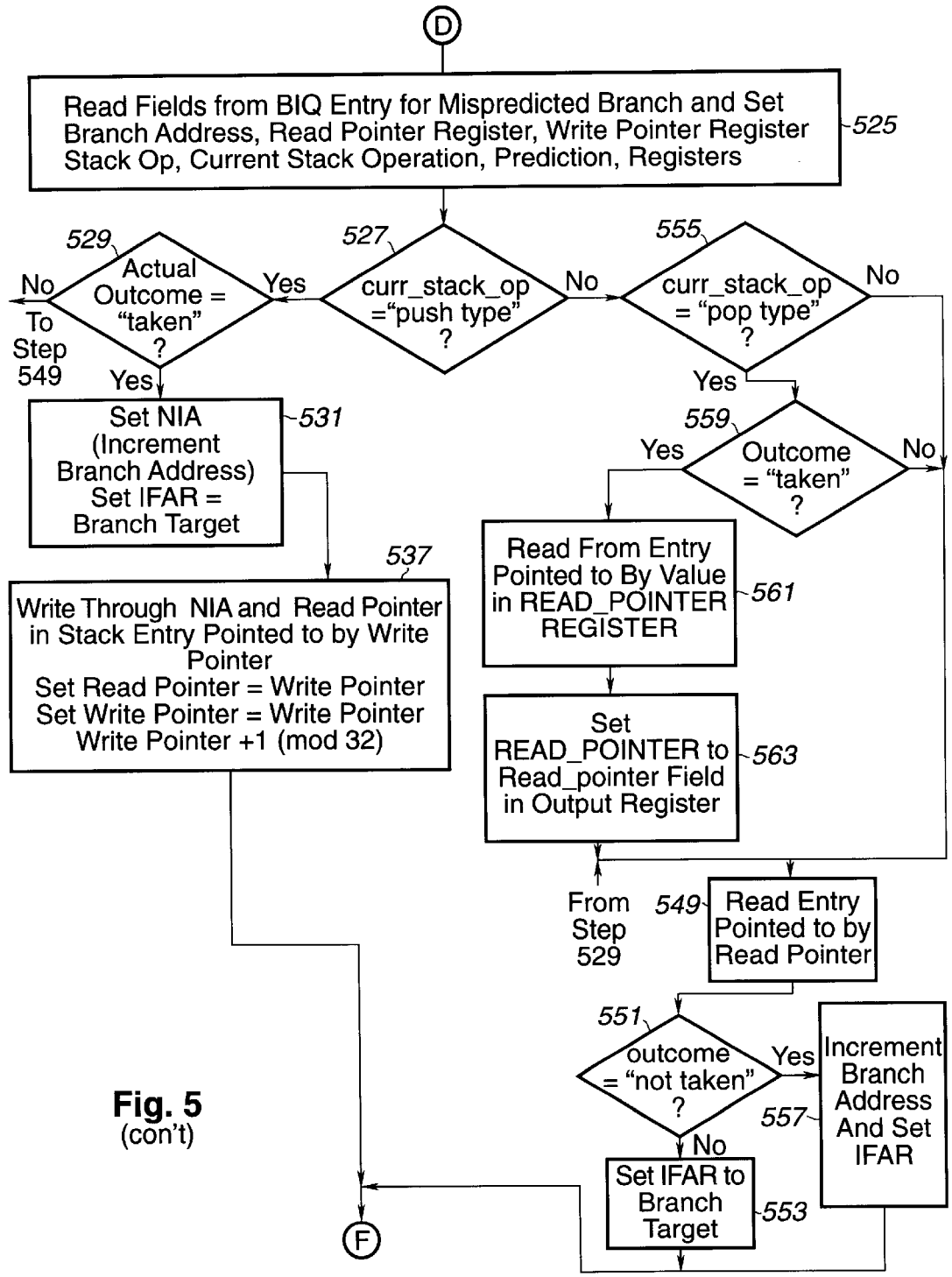
Fig. 5 (con't)

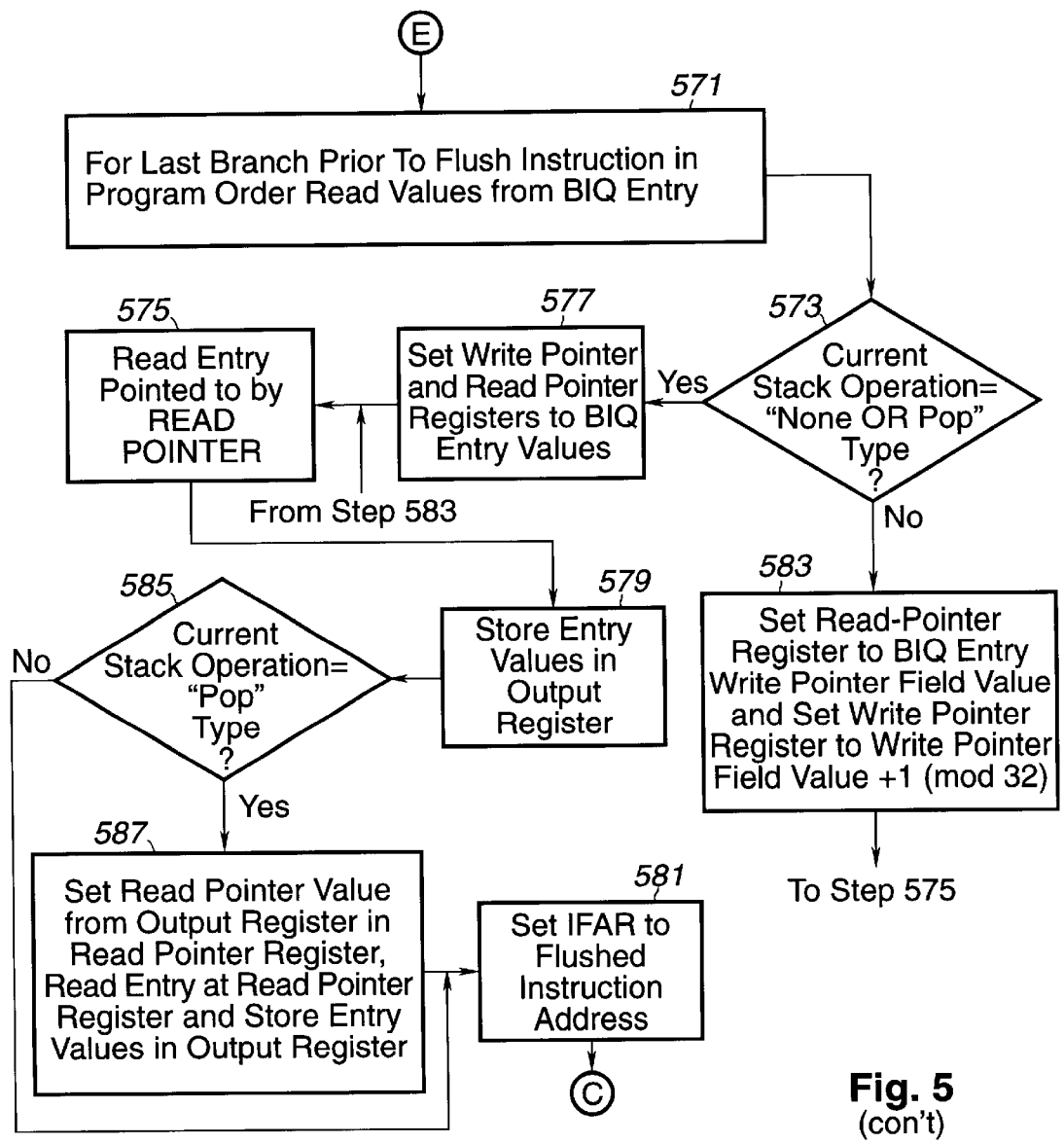
Fig. 5 (con't)

APPARATUS AND METHOD FOR RECOVERING A LINK STACK FROM MIS-SPECULATION

TECHNICAL FIELD

The present invention relates generally to information processing, and in particular to apparatus and method for recovering a link stack from mis-speculation.

BACKGROUND INFORMATION

Modern high frequency microprocessors are typically deeply pipelined devices. For efficient instruction execution in such processors, instructions are often fetched and executed speculatively. An instruction may be fetched many cycles before it is executed. Since branch instructions may cause instruction fetching to start from a non-sequential location, the direction and target of a branch instruction is predicted when the branch is fetched so that instruction fetching can proceed from the most likely address. The prediction is compared with the actual direction and target of the branch instruction when the instruction is executed. If it is determined that the branch has been mispredicted (either its target or its direction), then the branch instruction is completed and all instructions fetched after the branch are flushed out of the instruction pipeline and new instructions are fetched either from the sequential path of the branch (if the branch is resolved as not taken) or from the target path of the branch (if the branch is resolved as taken).

Often there are a significant number of branches (i.e., subroutine calls and returns) between the instructions that are being fetched and the instructions that are being executed in the device execution units. Therefore, to handle subroutine calls and returns efficiently, many high frequency microprocessors employ a link stack. On a subroutine call, the address of the following instruction is "pushed" into the stack while on a subroutine return, the entry at the top of the stack (which is expected to contain the address of the instruction following the original subroutine call) is "popped" from the stack. Since pushing and popping from a hardware stack can normally be done much faster and several cycles before the corresponding branches are executed in a deeply pipelined processor, such a link stack mechanism helps implement efficient instruction fetching across subroutine calls and returns to a great extent. Notwithstanding, the link stack can become corrupted during the process of speculative instruction fetching and execution.

Consider, for example, the case where a subroutine call is performed using a "branch and link instruction" and a return from subroutine is achieved using a "branch to link register" or "bclr" instruction. It may happen that a "bclr" instruction, which for example returns to a location "A", is fetched speculatively followed by a speculative fetch of a "branch and link" instruction, for example from call-site B. The link stack is updated at fetch time, such that after these instructions are fetched, the address location "A" is replaced by the address location "B+4" (each instruction consists of four bytes) at the top of the link stack. Since both the "bclr" and "branch and link" instructions are speculatively fetched, they may not ultimately be in the execution path. If these instructions are not in fact in the execution path, (in which case the instructions are flushed out), the link stack becomes corrupted.

Generally, any time one or more "bclr" instruction is followed by one or more "branch and link" instructions in the speculated path, the link stack becomes corrupted if the speculation turns out to be wrong. For a commercial programming workload, about 2% of the instructions are "bclr" instructions and therefore it becomes very important to be able to predict the target address for these instructions with a good degree of accuracy in deeply pipelined machines. Thus, the need has arisen for circuits, systems and methods for recovering a link stack from mis-speculation.

SUMMARY OF THE INVENTION

The principles of the present invention are embodied in apparatus and methods for performing link stack operations. In accordance to these principles, one method of writing to the link stack, includes selecting a location in the link stack pointed to by a current write pointer. A link address associated with an instruction is written along with a current read pointer to the link stack into the selected location. The read and write pointers are updated, with the new read pointer equaling the current write pointer.

The principles of the present invention additionally provide for the reading from the link stack. In one embodiment, a location in the link stack is selected using a current read pointer. The new read pointer and a link address associated with an instruction are read from the selected location.

After reads and writes, the inventive principles provide that the read and write pointers may be written into a branch information queue. Then, in response to an instruction flush, the read and write pointers are retrieved from the branch information queue corresponding to the last executed branch instruction at or before the selected instruction flush point. These read and write pointers become the current read and write pointers.

The present inventive principles provide a major advantage since the link stack is now fully recoverable from a branch mis-speculation.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which:

FIGS. 3A and 3B illustrate, in block diagram form, a link stack apparatus according to an embodiment of the present invention;

DETAILED DESCRIPTION

Figure 1:
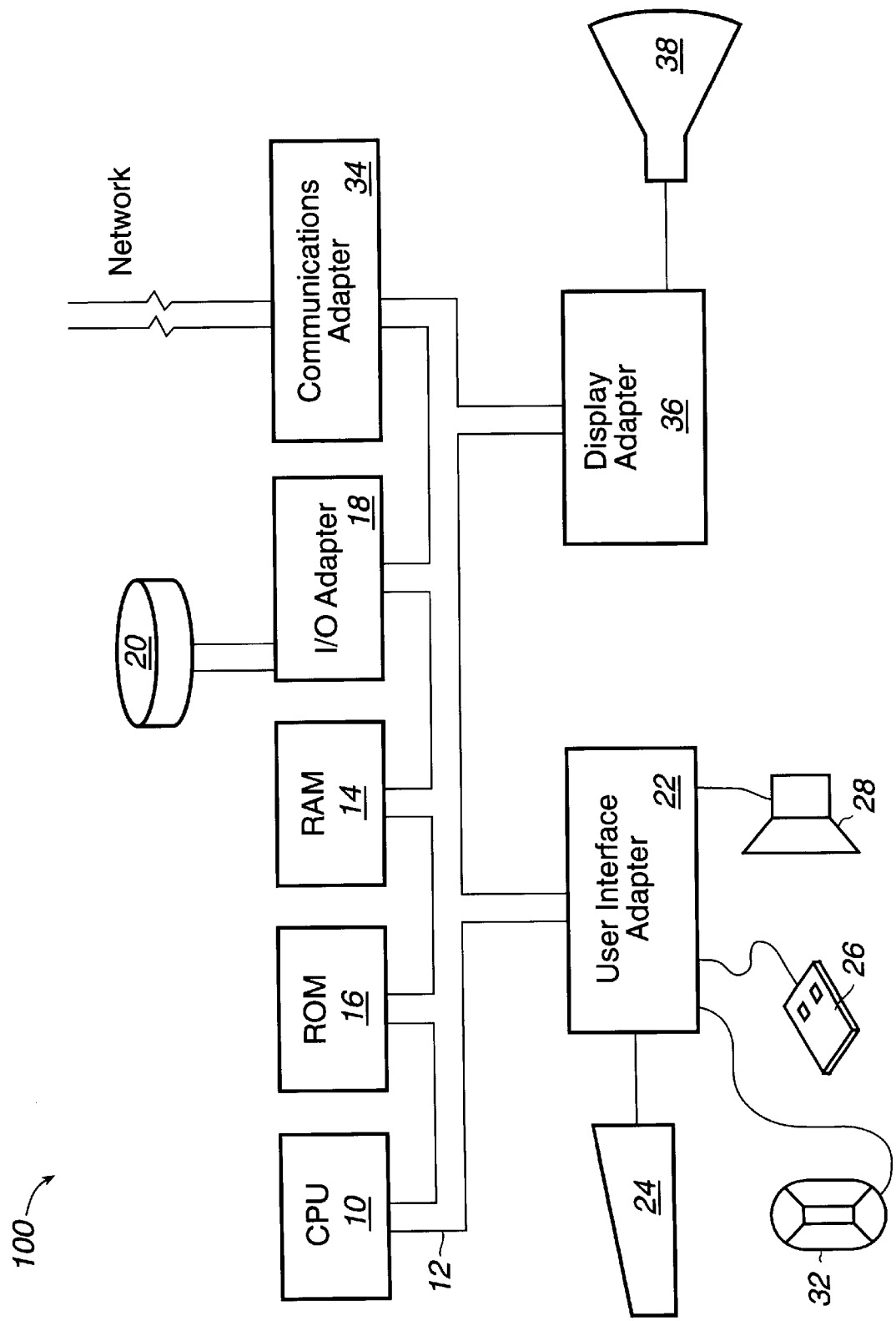
FIG. 1 is a high level functional block diagram of a representative data processing system suitable for practicing the principles of the present invention.

In the following description, numerous specific details are set forth to provide a thorough understanding of the present invention. It should be noted, however, that those skilled in the art are capable of practicing the present invention without such specific details. In other instances, well-known circuits have been shown in block diagram form in order not to obscure the present invention in unnecessary detail.

All such variations are intended to be included within the scope of the present invention. It will be recognized that, in the drawings, only those signal lines and processor blocks necessary for the operation of the present invention are shown.

Referring to the drawings, depicted elements are not necessarily shown to scale, and like or similar elements are designated by the same reference numeral through the several views.

Referring to FIG. 1 is a high level functional block diagram of a representative data processing system 100 suitable for practicing the principles of the present invention. Processing system 100, includes a central processing system (CPU) 10 operating in conjunction with a system bus 12. CPU 10 may be for example, a reduced instruction set computer (RISC), such as an IBM POWERPC™ Processor, or a complex instruction set computer (CISC). System bus 12 operates in accordance with a standard bus protocol, such as the ISA protocol, compatible with CPU 10.

CPU 10 operates in conjunction with read-only memory (ROM) 16 and random access memory (RAM) 14. Among other things, ROM 16 supports the basic input output system (BIOS). RAM 14 includes for example, DRAM (Dynamic Random Access Memory) system memory and SRAM (Static Random Access Memory) external cache.

I/O Adapter 18 allows for an interconnection between the devices on system bus 12 and external peripherals, such as mass storage devices (e.g., a hard drive, floppy drive or CD/ROM drive), or a printer. A peripheral device 20 is for example, coupled to a peripheral control interface (PCI) bus, and I/O adapter 18 therefore may be for example PCI bus bridge.

User interface adapter 22 couples various user input devices, such as keyboard 24, mouse 26, touchpad 32 or speaker 28 to the processing devices on bus 12.

Display adapter 36 supports a display 38 which may be for example a cathode ray tube (CRT), liquid crystal display (LCD) or similar conventional display unit. Display adapter 36 may include among other things a conventional display controller and frame buffer memory.

System 100 can be selectively coupled to a computer or telecommunications network through communications adapter 34. Communications adapter 34 may include for example, a modem for connection to a telecommunications network and/or hardware and software for connecting to a computer network such as a local area network (LAN) or wide area network (WAN).

Figure 2:
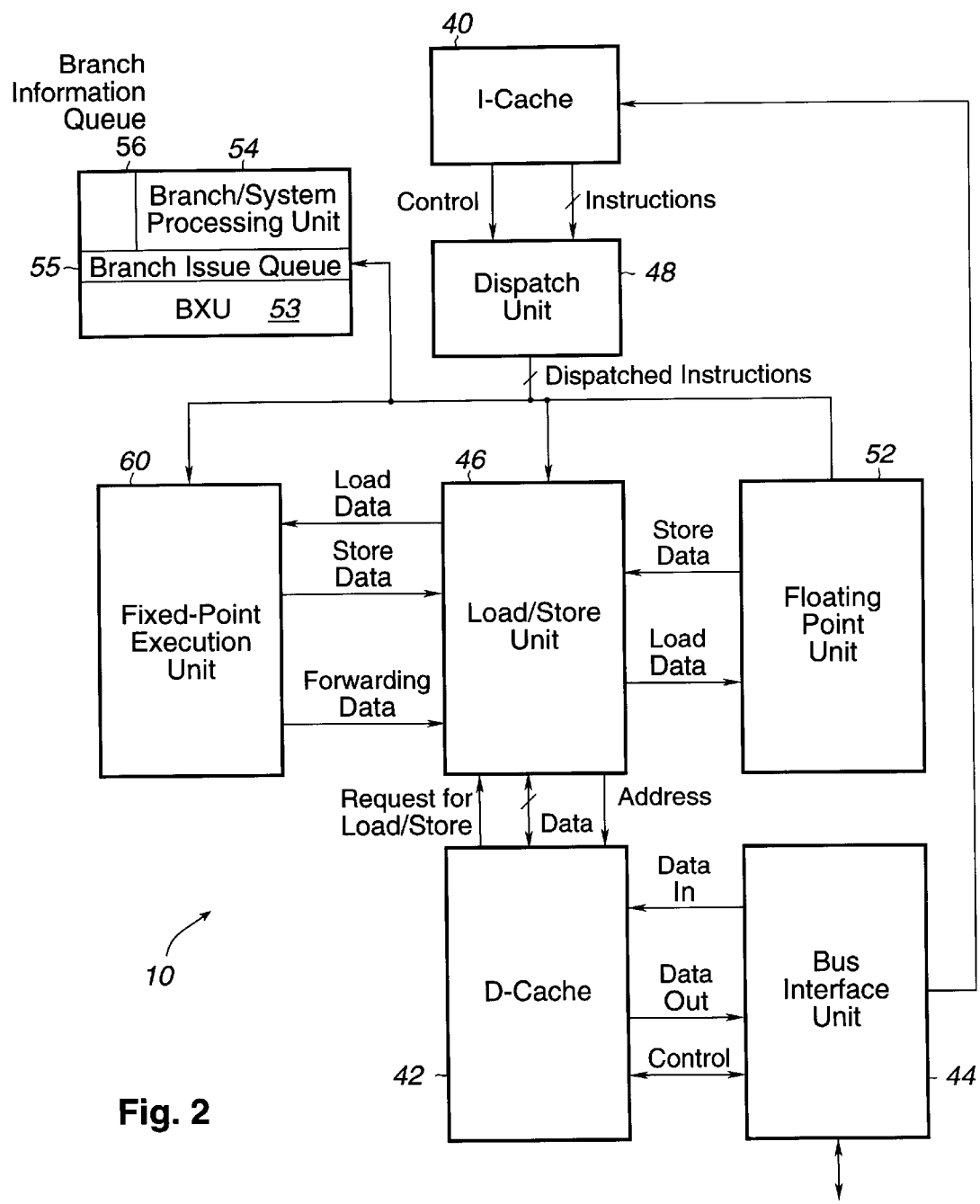
FIG. 2A is a high level functional block diagram of selected operational blocks within CPU.
FIG. 2B schematically illustrates a branch information queue entry, which may be used in the present invention.

FIG. 2 is a high level functional block diagram of selected operational blocks within CPU 10. In the illustrated embodiment, CPU 10 includes internal instruction cache (I-cache) 40 and data cache (D-cache) 42 which are accessible through bus 12 and bus interface unit 44 and load/store unit 46. In the depicted architecture, CPU 10 operates on data in response to instructions retrieved from I-cache 40 through instruction dispatch unit 48. In response to dispatch instructions, data retrieved from D-cache 42 by load/store unit 46 can be operated upon using either fixed point execution unit 50 or floating point execution unit 52. Instruction branching is controlled by branch/system processing unit 54.

Branch/system processing unit 54 maintains a branch information queue (BIQ structure) 56 for each branch that has been fetched from instruction cache 40 and has not yet been committed to one of the branch execution units. The BIQ structure contains all the necessary information for each branch being pipelined. As discussed further below, the BIQ stores a read pointer value denoted "read-ptr," and a write pointer value denoted "write-ptr," from the link stack, in accordance with the preferred embodiment of the present inventive concept. BIQ 56 includes a plurality of entries 58. An exemplary BIQ entry 58 which may be used in the present invention is illustrated in FIG. 2B. Each entry 58 includes a plurality of fields 58a–58f. The branch address is held in field 58a. A value of the predicted address is contained in field 58b. Write pointer and read pointer values are stored in fields 58c and 58d, respectively. A value representing the current stack operation, labeled current-stack-op, is held in field 58e. Field 58f holds a branch prediction (one of the determined values signaling whether the corresponding branch is predicted "taken" or "not taken"). Branch/system processing unit also includes a branch issue queue 55 which holds branch instructions for issuing to branch execution unit (BXU) 53.

Figure 3A:
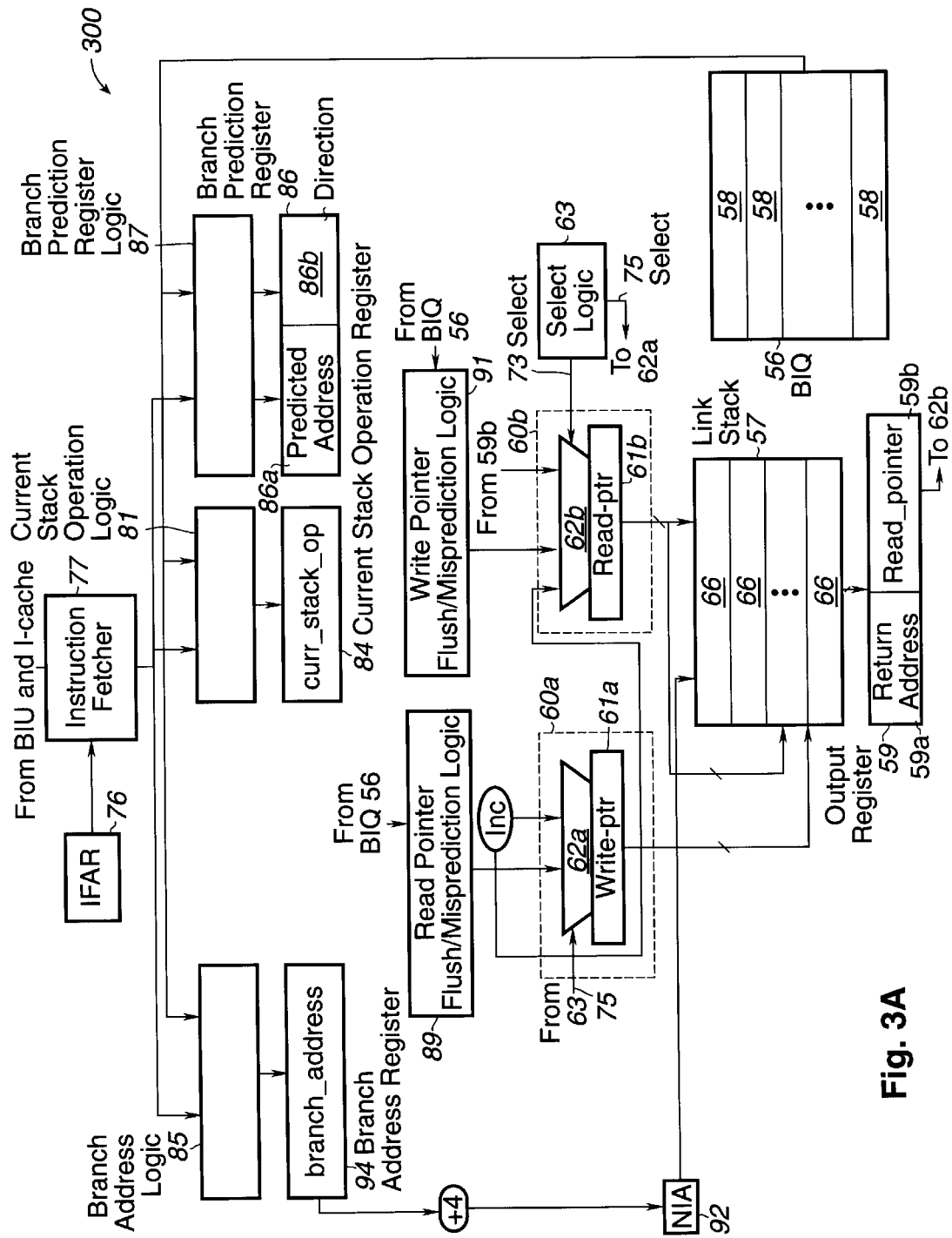

As follows FIG. 3A is a logical diagram of a link stack apparatus 300 illustrating the principles of the present invention. According to these principles, a recoverable link stack approach is used which can be described as follows. A link stack 57 having a predetermined plurality, n, of entries 66 is provided. As illustrated in FIG. 3B each entry 66 includes two fields. Fields 66a contains a return address value, which is the address to which program execution returns following a branch instruction. Field 66b includes a value of a read pointer (denoted "read_pointer" or "read_ptr"), as described further below. The operation of link stack 57 and the other components constituting the apparatus in FIG. 3A would be described in detail in conjunction with FIG. 5. However, the principles of the operation may be understood as follows.

Separate write and read pointers are maintained. These may be held in registers 61a and 61b, respectively, in corresponding ones of pointer logic 60a and 60b. Writing into the stack takes place at the entry specified by the value of the write pointer. Values are read from the link stack and loaded into output register 59 from the entry pointed to by the read pointer value in register 61b.

For a write operation, that is writing into the stack in response to a "branch and link" type instruction, the return address and the current content of the read pointer register 61b are stored into the corresponding fields in the link stack entry pointed to by the value of the write pointer. The value of the write pointer in register 61a is then written into the read pointer register 61b via multiplexer (MUX) 62b. The inputs in multiplexer 62b are selected in response to select 73 provided by select logic 63. Select logic 63 performs a portion of the method 500 of operation of apparatus 300 discussed hereinbelow in conjunction with FIG. 5. The write pointer is then updated by incrementing the value of the write pointer in register 61a and storing the updated value back into register 61a via MUX 62a in response to select 75 from select logic 63. Then, the contents of write pointer register 61a and read pointer 61b are stored into an entry in the BIQ corresponding to the Push type instruction generating the write into the stack.

Figure 5:
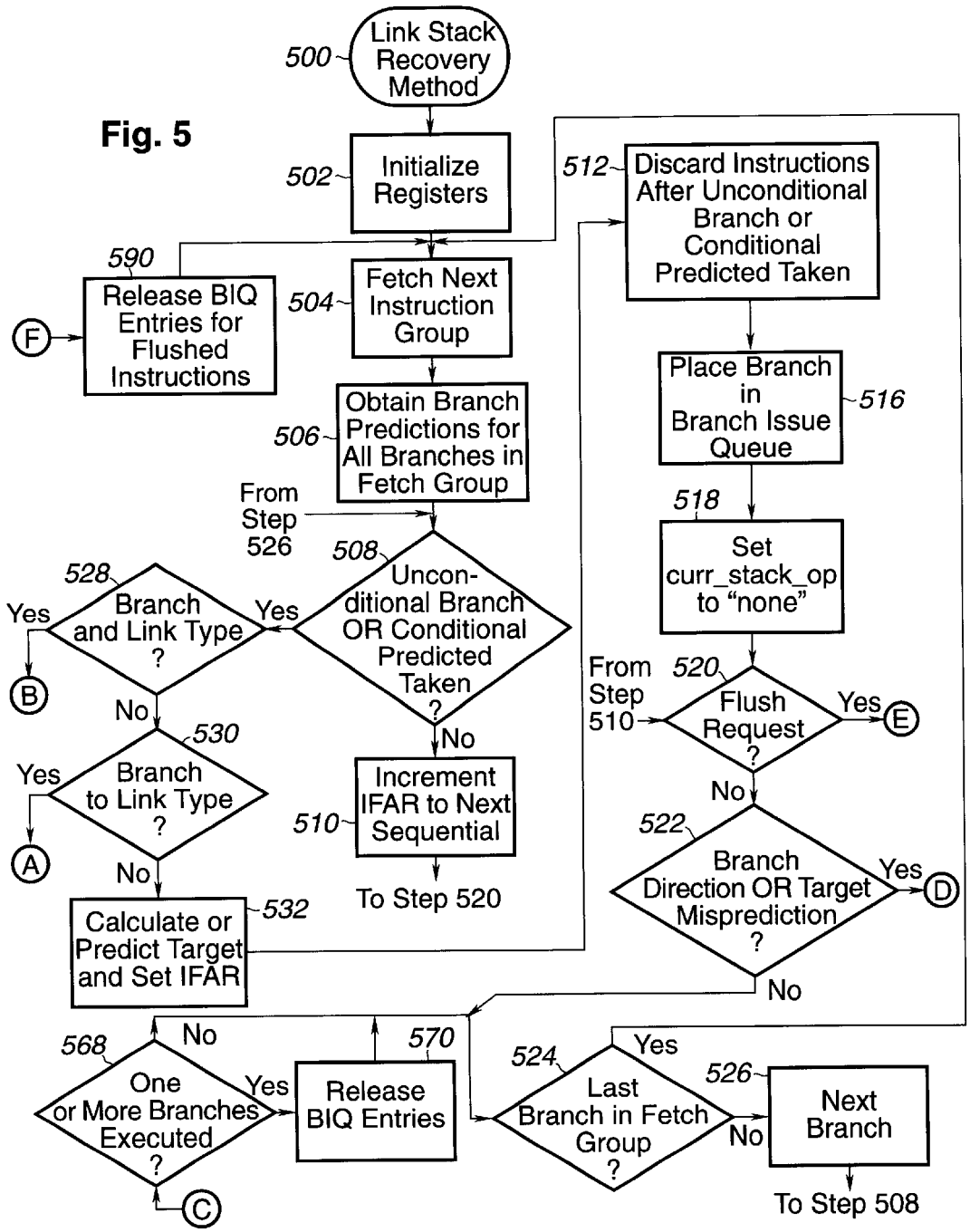
FIG. 5 illustrates in flowchart form a methodology for performing link stack operations in accordance with an embodiment of the present invention.
Figure 5:
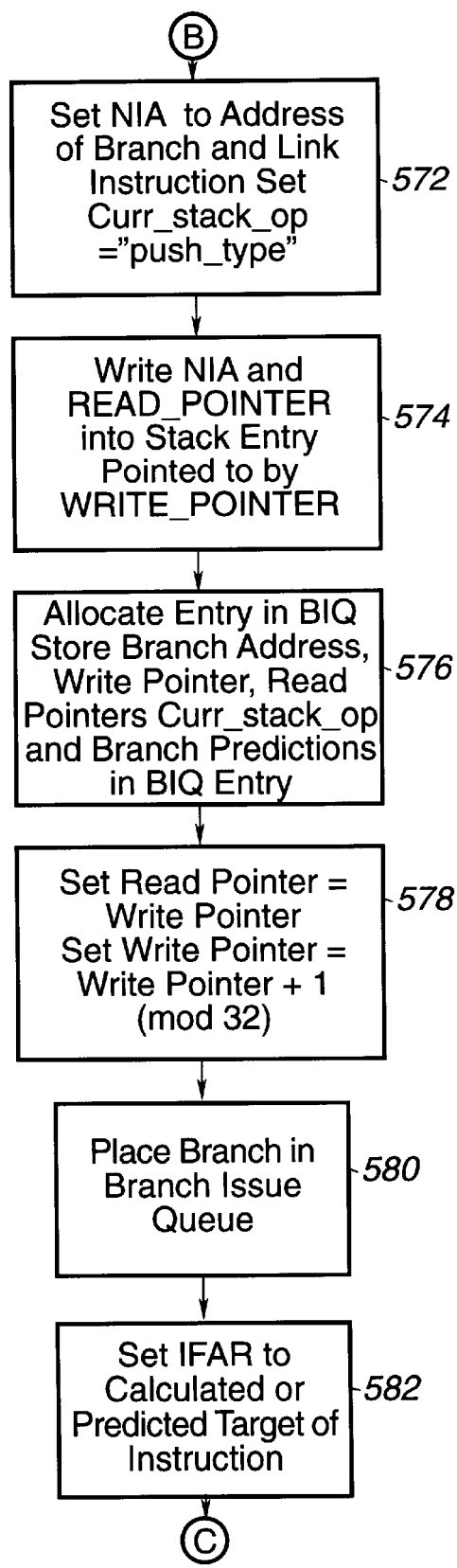
Figure 5:
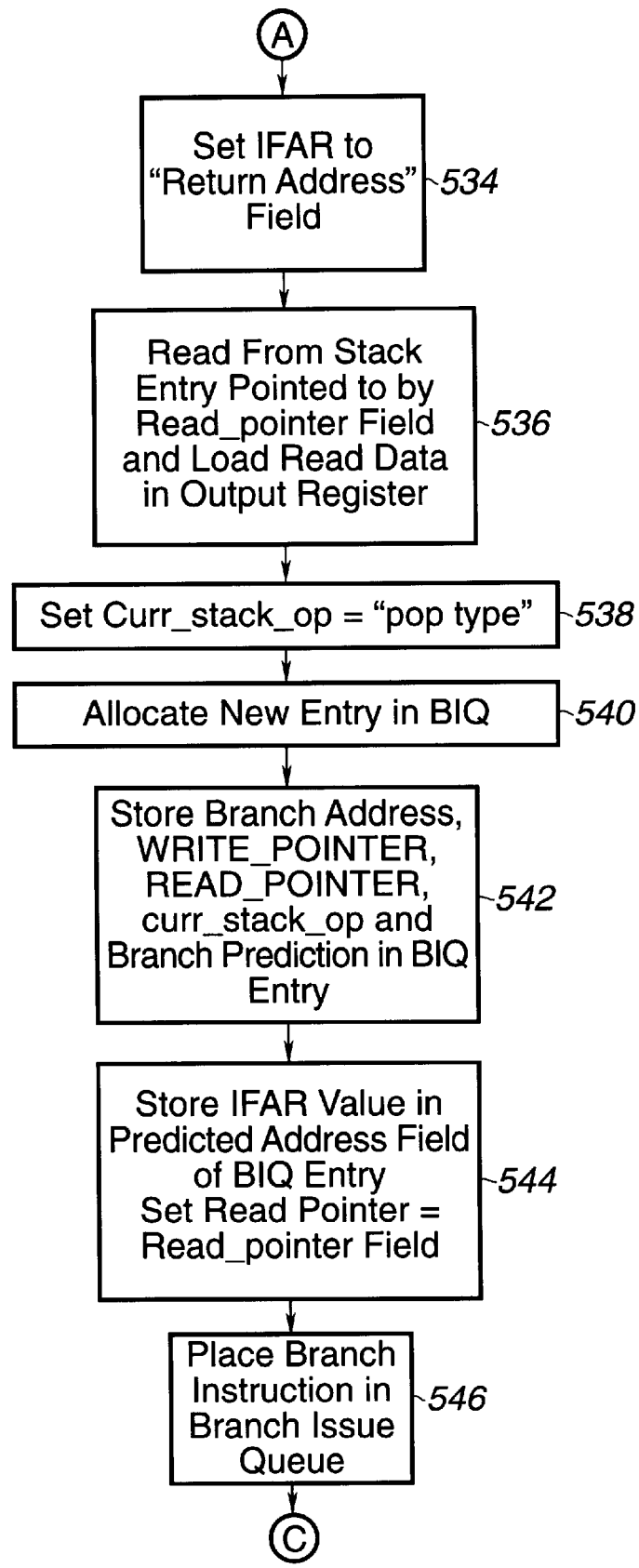

In response to a "branch to link" type branch instruction, values are popped from the stack. To read from the stack, the contents of the entry at the position determined by the value of the read pointer in register 61b are loaded into the output register. The read pointer is updated with the read pointer value read from the stack entry, which is being held in field 59b of output register 59. The contents of write pointer 61a and read pointer register 61b are stored into the corresponding fields in the BIQ entry 58 for the Pop type instruction generating the read from the stack. During an instruction flush due to a branch misprediction or other flush event, the pointer values stored in the BIQ entries are used to recover the read and write pointers corresponding to the last correctly executed branch instruction at or before the flush point. The operation of the link stack apparatus in response to a branch misprediction or other flush event will be described in detail in conjunction with FIG. 5 illustrating methodology 500 for link stack operations which may be performed by apparatus 300, FIG. 3A.

Figure 4:
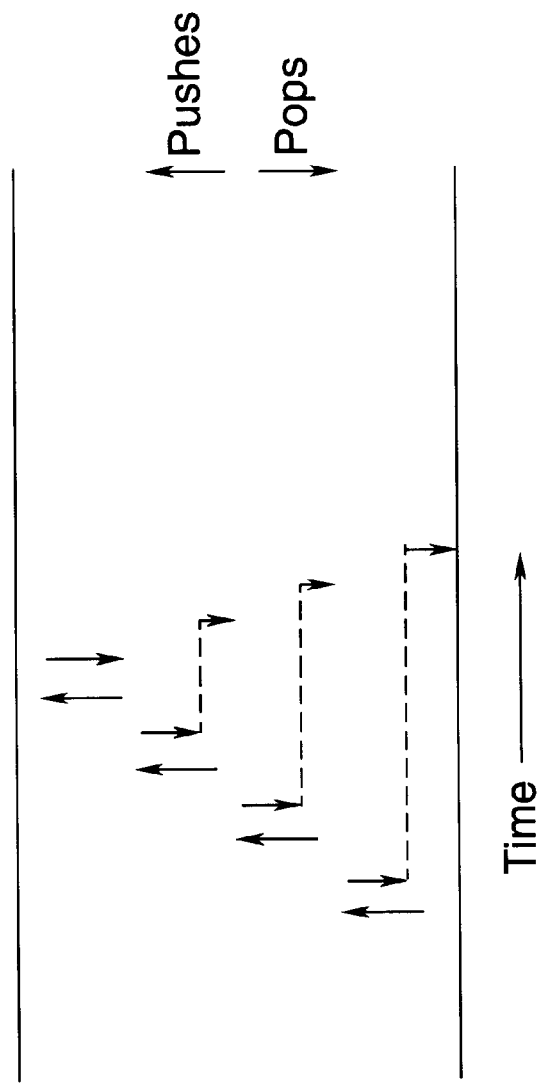
FIG. 4 graphically represents Push and Pop operations on the link stack.

FIG. 4 graphically represents "Push" and "Pop" operations. As described in conjunction with FIGS. 3A and 3B and further in conjunction with FIG. 5, reads are made from the stack using a value of the read pointer. Similarly, writes to the link stack are made using a value of the write pointer. Values of the pointers are stored in respective fields of a BIQ entry corresponding to each instruction which may then be used to recover the link stack for speculatively executed branches that are ultimately resolved as mispredicted.

During an instruction flush, the read and write pointers corresponding to the last correctly executed branch instruction at or before the flush point are retrieved from the BIQ. These read and write pointers become the new current read and write pointers. Pushes and Pops can then continue to and from the link stack without hitting corrupted (incorrect) entries. For example, consider the sequence of Push and Pop operations shown in TABLE 1 for a link stack implementation having thirty-two entries. For a Flush Up To Action 2, the read pointer retrieved from the BIQ is 2 and the write pointer is a 3, as expected. (A flush up to Action X means that all branches after Action X is discarded, but the branch represented by Action X is not.) Similarly, for a Flush Up To Action 5, the read pointer from the BIQ is 4 and the write pointer is 5, which are also correct values. The same is true for a Flush Up To Action 7, where the read pointer has the expected value of 1 and the write pointer has the expected value of 5.

TABLE 1

| ACTION | READ POINTER | | WRITE POINTER | | |
|---|---|---|---|---|---|
| | Before Stack Operation | After Stack Operation | Before Stack Operation | After Stack Operation | STACK ENTRY Written |
| 0. PUSH A | 31 | 0 | 0 | 1 | A, 0 |
| 1. PUSH B | 0 | 1 | 1 | 2 | B, 0 |
| 2. PUSH C | 1 | 2 | 2 | 3 | C, 1 |
| 3. POP (C) | 2 | 1 | 3 | 3 | — |
| 4. PUSH D | 1 | 3 | 3 | 4 | D, 1 |
| 5. PUSH E | 3 | 4 | 4 | 5 | E, 3 |
| 6. POP (E) | 4 | 3 | 5 | 5 | — |
| 7. POP (D) | 3 | 1 | 5 | 5 | — |
| 8. POP (B) | 1 | 0 | 5 | 5 | — |
| 9. POP (A) | 0 | 31 | 5 | 5 | — |
| 10. PUSH F | 31 | 5 | 5 | 6 | F, 31 |

Refer now to FIG. 5 illustrating, in flow chart form, link stack recovery process 500. In step 502, process 500 begins by initializing in the link stack apparatus, for example, the link stack apparatus illustrated in FIG. 3A. The first instruction in the program being executed is stored in the instruction fetch address register (IFAR) 76. Instruction addresses in the IFAR are provided to instruction fetcher 77 which accesses instructions cached in the I-cache or, if not in the I-cache, from lower levels of memory. As discussed above in conjunction with FIG. 3A, each of pointer logic 60a and 60b include a corresponding pointer register, write pointer register 61a and read pointer register 61b. Each of these registers may be initialized with the value "0". In an embodiment of the present invention, the initial values represent a selected initial set of values in the link stack. It would be understood by an artisan of ordinary skill that the present invention does not require a particular choice of the initial values and alternative embodiments having different selected initial conditions would be within the spirit and scope of the present invention.

In step 504, a next instruction group is fetched. A fetched instruction group will hereinafter be referred to as an "fetch group." A fetch group may include from one to eight instructions in an embodiment of the present invention in which instructions are four bytes long and instructions are fetched up to, but not including, a byte with an address that is a multiple of thirty-two. It would be understood by an artisan of ordinary skill in the art that in alternative implementations in which instruction lengths include other numbers of bytes, or in which other fetch schemes are implemented, that the number of instructions in a fetch group may be different. It would be further understood by an artisan of ordinary skill that such alternative embodiments would also be within the spirit and scope of the present invention.

For the fetch group fetched in step 504, branch predictions are obtained for all branches in the fetch group, if any. Branch predictions may be obtained, in step 506, in accordance with the co-pending, commonly-owned U.S. patent application entitled, "Circuits, Systems and Methods for Performing Branch Predictions by Selectively Accessing Bimodal and Fetched-Based Branch History Tables," Ser. No. 09/435,070 which has hereinabove been incorporated by reference. However, an artisan of ordinary skill in the art would recognize that other branch prediction mechanisms may also be used in the present invention, and alternative embodiments thereof incorporating such other branch prediction mechanisms would be within the spirit and scope of the present invention.

Methodology 500 then loops over all of the branches in the fetch group and determines their effect on the link stack, such as link stack 57 in FIG. 3A. In step 508, it is determined if a current branch, if any, is an unconditional branch or a conditional branch predicted taken. If, in step 508, the branch is not an unconditional branch and is not a conditional branch predicted taken, then methodology 500 proceeds by the "No" branch of step 508, and in step 510 increments the IFAR to the next sequential address. Step 508 also is false, that is, proceeds by the "No branch if there are no branches in the fetch group." Process 500 then proceeds to step 520, bypassing steps 512–518. (Step 512, discussed below, is bypassed, because the "No" branch in step 508 has been taken, and there are no instructions to be flushed.)

In step 520, it is determined if a flush request is received. A flush request is generated by the processor when an event occurs that requires instructions be flushed from the machine. Such flush events may occur for a variety of reasons other than branch mispredictions, discussed below. For example, modern processors implement instructions that load multiple words at a time from memory. An instruction loading four words ("quad" word instruction) is an atomic instruction loading 128 bits, in an implementation having thirty-two bit words. Typically, this instruction is internally implemented as two double-word loads from two successive double-words in memory. In a multiprocessor system, a second processor may store a value into the second doubleword before it has been loaded by the first processor. In such a case, the first processor, snooping the bus, will observe a snoop event, and will generate a flush request causing the quad word load along with all the successive operations to be flushed out of the first processor. An artisan of ordinary skill would recognize, however, that other operations may also give rise to flush events. If, in step 520, a flush request has been received, then method 500 proceeds by steps 571–581 to recover the link stack. Steps 571–581 will be discussed hereinbelow.

If, however, a flush request is not received in step 520, in step 522, it is determined if a branch direction or target misprediction has occurred. If so, the methodology 500 executes steps 525–563 to recover the link stack. Steps 525–563 will subsequently be described in further detail. Otherwise, in step 524, it is determined if a last branch instruction in the current fetch group has been processed. If so, methodology 500 returns to step 504. Otherwise, the next branch, step 526, is processed by returning to step 508.

Returning now to step 508, if the branch instruction in the fetch group being processed is an unconditional branch or a conditional branch predicted, in step 506, to be taken, it is determined in step 528 if the branch instruction is a branch and link-type instruction. If so, methodology 500 performs the link stack operations associated with the corresponding push operation in accordance with steps 572–582. These steps will be discussed further below. If, however, in step 528, the instruction is not a branch and link-type instruction, then in step 530, it is determined if the instruction is a branch-to-link-type instruction. If the instruction is not a branch-to-link-type instruction, in step 532, the IFAR is set. The address set in the IFAR is the target address of the branch, which, depending on the specific branch instruction, may either be predicted or calculated. For example, if the instruction is a relative branch, the target address may be calculated by adding the branch target operand to the current instruction address. Similarly, an absolute branch instruction branches to the absolute address represented by the target operand. On the other hand, the branch may be conditional, in which instance, the target address is the predicted address from step 506, or calculated from the instruction itself, depending on the specific type of the conditional branch. Methodology 500 then continues to step 512. In step 512, all instructions after an unconditional branch or a conditional branch predicted taken, if any, are discarded, and methodology 500 continues with step 516.

In step 516, the branch is placed in the branch issue queue, such as branch issue queue 55, FIG. 2A, for eventual execution by a branch execution unit such as BXU 53.

In step 518, the value in current stack operation register 84 is set to "none". In an embodiment of the present invention, the values which data value representing the current stack operation ("curr_stack_op") may be represented by two-bit values. For example, the value "none" may be represented by "00", a push-type operation may be represented by "10" and a pop-type operation may be represented by "01". However, it would be understood by an artisan of ordinary skill in the art that other, predetermined values may be used to represent these stack operation types.

If, the instruction is a branch-to-link-type instruction, in step 530, then methodology 500 proceeds to step 534–546 to perform the link stack operations associated with the corresponding Pop operation.

In step 534, the IFAR is set to the data value ("return_address") representing the return address following the branch operation in field 59a of output register 59, FIG. 3A. In step 536, the output register is loaded by reading from the stack entry pointed to by the read pointer. In step 538, the value of curr_stack_op, in register 84, is set to. "pop type" operation using the corresponding predetermined value which may be in accordance with those previously discussed above in conjunction with step 518. The value of curr_stack_op in register 84 may be set by current stack operation logic 81 in an embodiment of the present invention in accordance with the apparatus of FIG. 3A.

In step 540, a BIQ entry is allocated for the branch instruction and, in step 542, the corresponding values are stored in the respective fields, such as fields 58a, 58c–58f of BIQ entry 58, FIG. 3C. In step 544, the value of the IFAR is stored in the predicted address field, for example, field 586 in the BIQ entry allocated in step 540. On execution of the branch, the predicted address stored in the corresponding BIQ entry is compared with the actual target address to determine if a misprediction has occurred. Additionally, read pointer register 61b is set to the value of the read pointer in field 59b of output register 59. The value may be set by selecting the input of multiplexer 62b fed back from 59b in register 59. The setting of read pointer register 61b may be performed by select logic 63 in an embodiment of the present invention in accordance with FIG. 3A. In step 546, the branch is placed in the branch issue queue for its eventual execution by the branch execution unit.

Methodology 500 then proceeds to step 568 and determines if one or more branches have been executed by the branch execution unit. If so, the corresponding BIQ entries are released in step 570 and methodology 500 then proceeds to step 524 to determine if there are additional branches in the current fetch group, as previously described hereinabove. Otherwise, in step 568, if no branches have been executed, step 570 is bypassed and methodology 500 proceeds to step 524.

Returning to step 528, if the current branch is a branch and link-type instruction, then a push operation is performed on the link stack. Link stack recovery methodology 500 executes method steps 572–590 in response to a push operation in the stack.

In step 572, the next instruction address is set. In an embodiment of the present invention in accordance with FIG. 3A, the next instruction address may be set in NIA register 92. The next instruction address is determined by incrementing the address of the branch instruction by a predetermined value. In an embodiment of the present invention in which instructions are four bytes long, the branch instruction is incremented by four. However, it would be understood by an artisan of ordinary skill in the art that the present invention may be used in embodiments in which instructions have byte-lengths other than four and the next instruction address would be determined by incrementing the branch instruction address accordingly. An artisan of ordinary skill would further understand that such alternative embodiments would be within the spirit and scope of the present invention. Additionally, in step 572, the value of curr_stack_op is set to the predetermined value representing a "push-type" operation as described in detail in conjunction with step 518 above.

In step 574 the NIA and read pointer value in the read pointer register, for example, register 61b, FIG. 3A, are written into the stack entry pointed to by the value of the write pointer. In step 578, an entry in the BIQ is allocated for the current branch instruction in the fetch group and the corresponding data values are stored in the respective fields of the BIQ entry. The read pointer value is updated in step 578, by writing the value of the write pointer to the read pointer register, such as register 61*b*. The value of the read pointer may be written by selecting the corresponding input in MUX 62*b* in accordance with apparatus 300, FIG. 3A. This step 578 may be performed, in part, by select logic 63. Additionally, in step 578, the write pointer is then updated by incrementing the value by 1, modulo 32, in an embodiment of the link stack having thirty-two entries. The write pointer value, in the write pointer register, such as register 61*a*, may be updated via MUX 62*a* by selecting the corresponding input thereto, as shown in FIG. 3A.

In step 580, the branch is placed in the branch issue queue, for eventual execution by the branch execution unit.

In step 582, the IFAR is set to the actual or predicted target of the branch instruction. The actual target or predicted target is used in accordance with the actual branch and link-type instruction being processed. As discussed hereinabove in conjunction with step 532, a set of branch instructions may have target addresses that are immediately calculable. Other branch instructions may be conditional, in which instance the target addresses may be predicted addresses. The address set in the IFAR in step 592 is determined in accordance with the branch instruction having a target address that is calculable, or the branch instruction having a target address which is conditional, and, therefore, predicted. Methodology 500 then returns to step 568, as described hereinabove and the next branch, if any, in the fetch group is processed.

Upon execution of a branch instruction, the target address is resolved, if the branch is a conditional branch. The actual target address upon resolution, may differ from the predicted address. As previously discussed, link stack recovery methodology 500 determines if a branch misprediction has occurred, in step 522. To recover the link stack in the event of a misprediction, methodology 500 performs steps 525–563.

In step 525, the values are read from the fields in the BIQ entry for the mispredicted branch and the corresponding values are used to set branch address register 94, predicted address field 86*a* in branch prediction register 86, the branch prediction, "taken" or "not-taken" as appropriate, in prediction field 86*b* in branch prediction register 86, pointer registers 61*a* and 61*b*, and current stack operation register 84. In an embodiment of the present invention, branch address register 94 may be set by branch address logic 85 and fields 86*a* and 86*b* in branch prediction 110 register 86 may be set by branch prediction register logic 87, FIG. 3A. It is then determined, in step 527, if the value of curr_stack_op corresponds to a "push-type" operation, step 527. If so, it is determined, in step 529, if the actual outcome corresponds to a branch "taken". If the outcome is branch "taken", then in step 531, NIA register 92 is set by incrementing the branch address as previously described in conjunction with step 578, and the IFAR is set to the branch target address retrieved from the BIQ entry and set in the branch target field 86*a*, in step 525. Instructions subsequent to the mispredicted branch are also flushed from the pipeline in step 531. In step 537, the NIA and the read pointer value, from NIA 92 and register 61*b*, respectively, in an embodiment in accordance with FIG. 3A, are written through to the stack entry pointed to by the write pointer. Writing "through" these values means that the values also appear in the output register. Additionally, the read pointer is then set to the value of the write and the write pointer is incremented by 1, module 32 in an embodiment of a link stack having thirty-two entries. An artisan of ordinary skill would recognize that the link stack, such as link stack 57, FIG. 3A may have a predetermined plurality of entries, n, and in step 537, the write pointer would, accordingly, be incremented modulo n. The write pointer may be incremented in an embodiment in accordance with the apparatus of FIG. 3A via MUX 62*a*, and select logic 63 performing a portion of step 537. Methodology 500 then proceeds to step 591 and releases the BIQ entries corresponding to instructions flushed from the pipeline in response to the mispredicted branch, if any, and then continues to the next fetch group, step 504.

Returning to step 529, if the predicted outcome determined in step 529 is "not taken", then in step 549, the entry pointed to by the read pointer, register 61*b*, is read, and the data in the entry loaded in output register, such as output register 59, FIG. 3A. In step 551, the actual outcome is determined. If the actual outcome is branch "taken", then in step 553, the IFAR is set to the branch target address, and instructions subsequent to the mispredicted branch are flushed from the pipeline. Note that because methodology 500 has reached step 551 via the "No" branch of step 529 in this instance, and because a branch has mispredicted in step 522, the outcome in step 551 is necessarily branch "taken". Methodology 500 then returns to step 591, as discussed above.

Returning now to step 527, if the current stack operation as represented by the value of curr_stack_op is not a "push-type" operation, it is then determined in step 555 if the current stack operation, represented by the value of curr_stack_op, is a "pop-type" operation. Recall that branch operations are implemented that do not result in a value being pushed onto the link stack, or being popped from the link stack. If the current stack operation is neither a push-type or a pop-type operation, then methodology 500 proceeds by the "No" branch of step 555 to step 549, discussed above. However, now, in step 551, the outcome of the branch may either be "taken" or "not taken". If the outcome is "taken", the IFAR is set to the branch target address, in step 553. If, however, in step 551, the outcome is "not taken", then in step 557, the branch address is incremented by the instruction byte length, for example, four in an embodiment of the present invention, and the incremented address is set in the IFAR. Methodology 500 then returns to step 591 described hereinabove, and any BIQ entries corresponding to branches in the "not taken" path, which are flushed from the pipeline, are released.

If, however, in step 555, the current stack operation represented by the value of curr_stack_op is a "pop-type" operation, then in step 559, the outcome of the branch instruction is determined. If the branch is "not taken", then methodology 500 proceeds to step 549. Now, however, in step 551, because the outcome, as determined in step 559, is "not taken", step 551 necessarily proceeds by the "Yes" branch to step 557 to set the address in the IFAR.

If, however, the branch outcome is "taken" in step 559, in step 561 the stack entry pointed to by the current read pointer value, for example, in register 61*b*, FIG. 3A, and the values in the corresponding entry are loaded into output register 59, the value of the return address loaded in field 59*a* and the read pointer value from the stack entry in field 59*b*. In step 563, the value of the read pointer in the read pointer register, such as register 61*b* is set to the value in the output register, and methodology 500 then continues with step 549, as previously described. The value may be loaded by selecting the input in MUX 62*b* fed back from output register 59 field 59*b*. Now, however, in step 551, because in step 559 it was determined the branch was taken, then step 551 necessarily proceeds by the "No" branch and the IFAR is set in accordance with step 553. Methodology 500 then returns to step 568 to process the next branch in the fetch group, if any.

If a flush event occurs, as discussed hereinabove in conjunction with step 520, methodology 500 recovers the link stack by executing steps 571–581. In step 571, the values are read from the fields in the BIQ entry corresponding to the last branch in program order prior to the instruction generating the flush event. The current stack operation value is then tested in step 573. If the current stack operation is either "none" or a Pop type operation, the write pointer register and read pointer register are set to the corresponding BIQ entry values, step 577. If, however, the current stack operation is a Push type operation, step 573 proceeds by the "No" branch, and in step 583, the read pointer register is set to the corresponding BIQ entry value, and the write pointer register is set to corresponding value in the BIQ entry incremented by one, modulo 32 (in an embodiment having thirty-two entries in the link stack, and, generally, modulo n in an n-entry link stack). Then, the entry pointed to by the value of the read pointer is read, step 575. The values in the link stack entry read in step 575 are stored in the output register, for example, the return address is stored in field 59*a* of output register 59, and the read pointer value in field 59*b* of output register 59 in an embodiment of the present invention in accordance with FIG. 3A. Then, in step 585, the current stack operation is tested, and if the current stack operation is a Pop type operation, in step 587, the value of the read pointer in the corresponding field of the output register, for example the value in field 59*b* in FIG. 3, is set in the read pointer register, such as register 61*b*, FIG. 3. Additionally in step 587, the entry pointed to by the read pointer value set in the read pointer register is read, and the entry values are loaded into the output register. In step 581, the IFAR is set to the address of the flushed instruction, and methodology 500 returns to step 591 to release entries in the BIQ corresponding to any branch instructions flushed from the pipeline. If, however, in step 585, the current stack operation is not a "Pop" type operation, step 587 is bypassed and methodology 500 proceeds directly to step 581.

Although the present invention and its advantages have been described in detail, it should be understood that various changes, substitutions and alterations can be made herein without departing from the spirit and scope of the invention as defined by the appended claims.

What is claimed is:

1. A method of performing link stack operations comprising the steps of:
   writing to a link stack, said step of writing comprising the substeps of:
      selecting a location in the link stack pointed to by a current write pointer;
      writing a link address associated with an instruction and current read pointer to the link stack into the selected location;
      updating the read pointer such that the new read pointer equals the current write pointer; and
      updating the write pointer; and
   reading from the link stack, said step of reading comprising the substeps of:
      selecting a location in the link stack with a current read pointer; and
      reading a new read pointer and a link address associated with an instruction from the selected read location;
   wherein said step of writing further comprises the substep of writing the new read pointer and the updated write pointer into a branch information queue entry associated with the instruction.

2. The method of claim 1 where said substep of updating the write pointer comprises the substep of incrementing from the current write pointer to generate the updated write pointer.

3. The method of claim 1, wherein said step of reading further comprises the substep of writing the new read pointer from the link stack and the current write pointer into a branch information queue associated with the corresponding instruction.

4. The method of claim 1 and further comprising the step of performing a flush, said step including the substep of retrieving the read and write pointers from the branch information queue corresponding to a last correctly executed branch instruction at or before a selected instruction flush point, the retrieved read and write pointers operable for determining updated read and write pointer values in response to a type of said last correctly executed branch instruction.

5. A method of performing a Push to a link stack comprising the steps of:
   selecting a location in the link stack using a current write pointer;
   writing a link address to a corresponding branch instruction and a current read pointer into the selected location;
   updating the current read pointer;
   updating the write pointer; and
   writing the new read pointer and the updated write pointer into an associated branch information queue.

6. The method of claim 5, wherein said step of updating the write pointer comprises the step of incrementing the write pointer.

7. The method of claim 6 wherein said step of incrementing the write pointer comprises the step of incrementing the write pointer by one.

8. The method of claim 5, wherein said step of updating the current read pointer comprises the step of replacing the current read pointer with the current write pointer.

9. A method of reading from a link stack comprising the steps of:
   selecting a location from the link stack using a current read pointer;
   reading a new read pointer and a link address to a corresponding instruction from the selected read location in the link stack; and
   storing the new read pointer in an associated branch information queue.

10. The method of claim 9, and further comprising the steps of storing a current write pointer in said branch information queue after said step of reading.

11. Processing circuitry comprising branch instruction processing circuitry for performing Push and Pop operations and operable to:
    during a Push operation:
       write a link address to a corresponding instruction and a current read pointer into a location in the stack corresponding to a current write pointer;
       update the read pointer by replacing the current read pointer with the current write pointer;
       increment the current write pointer to generate an updated write pointer; and
       store the updated read and write pointers in a branch information queue; and during a Pop operation:
  read from a location in the stack pointed to by the current read pointer;
  updating the read pointer using the read pointer read from the selected read location in the stack; and
  storing the updating read pointer in the branch information queue.

12. The processing circuitry of claim 11 wherein said branch instruction circuitry is operable to retrieve the read pointer and the write pointer corresponding to the last correctly executed branch instruction at or before a corresponding instruction flush point from the branch information queue.

13. The processing circuitry of claim 11 wherein said branch processing circuitry forms a portion of a microprocessor.

14. The processing circuitry of claim 11 and further comprising an instruction cache, said instruction cache addressed by said link instruction.

15. The processing circuitry of claim 11 wherein a said Push operation is performed in response to a branch and link instruction.

16. The processing circuitry of claim 11 wherein a said Pop operation is performed in response to a branch to link register instruction.

17. Branch control circuitry comprising:
a link stack having a plurality of locations each for storing a link address, and a next stack read pointer;
a branch information queue having a plurality of locations for storing a write pointer and a read pointer to the link stack and corresponding to a branch instruction;
circuitry for accessing the link stack and operable to write a link address and a read pointer to a said location in said stack corresponding to a current write pointer;
pointer update circuitry operable following a write to generate a new read pointer using the current write pointer and generate a new write pointer by incrementing the current write pointer;
a read circuitry for reading a link address and a new read pointer from a said location in said link stack corresponding to a current pointer;
pointer update circuitry for updating said read pointer following a read by replacing said current read pointer with said new read pointer read from said stack during a read; and
storage circuitry for storing updated read and write pointers and corresponding locations in the branch information queue following reads and writes.

18. The branch control circuitry of claim 17 wherein said link stack and said branch information queue are implemented in hardware.

19. The branch control circuitry of claim 17 and further comprising circuitry for accessing said branch information queue and operable to retrieve the write and read pointers stored in a location corresponding to a last correctly executed branch instruction at or before a selected instruction flush point.

20. A data processing system comprising:
a memory; and
a central processing unit (CPU), said CPU operable for receiving at least one branch instruction from said memory, and wherein said CPU comprises:
  circuitry operable for writing to a link stack in response to said at least one branch instruction, said circuitry operable for writing comprising:
    circuitry operable for selecting a location in the link stack pointed to by a current write pointer;
    circuitry operable for writing a link address associated with an instruction and current read pointer to the link stack into the selected location;
    circuitry operable for updating the read pointer such that the new read pointer equals the current write pointer; and
    circuitry operable for updating the write pointer; and
  circuitry operable for reading from the link stack, said circuitry operable for reading comprising:
    circuitry operable for selecting a location in the link stack with a current read pointer; and
    circuitry operable for reading a new read pointer and a link address associated with an instruction from the selected read location;
  wherein said circuitry operable for writing further comprises circuitry operable for writing the new read pointer and the updated write pointer into a branch information queue entry associated with the instruction.

21. The data processing system of claim 20 where said circuitry operable for updating the write pointer comprises circuitry operable for incrementing the current write pointer to generate the updated write pointer.

22. The data processing system of claim 20 wherein said circuitry operable for reading further comprises circuitry operable for writing the new read pointer from the link stack and the current write pointer into a branch information queue associated with the corresponding instruction.

23. The data processing system of claim 20 wherein said CPU further comprises circuitry operable for performing a flush, said circuitry including circuitry operable for retrieving the read and write pointers from the branch information queue corresponding to a last correctly executed branch instruction at or before a selected instruction flush point, the retrieved read and write pointers operable for determining updated read and write pointer values in response to a type of said last correctly executed branch instruction.

* * * * *